(12) United States Patent
Deman et al.

(10) Patent No.: US 10,138,971 B1
(45) Date of Patent: Nov. 27, 2018

(54) DISPENSING PUMP WITH POLYMER COMPRESSION SPRING ASSEMBY

(71) Applicant: Silgan Dispensing Systems Corporation, Grandview, MO (US)

(72) Inventors: Eelco H. Deman, Waalwijk (NL); Paulus Zuijderduijn, Waalwijk (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 15/861,108

(22) Filed: Jan. 3, 2018

(51) Int. Cl.
| | | |
|---|---|---|
| *B05B 11/00* | (2006.01) | |
| *F16F 1/36* | (2006.01) | |
| *F16F 1/373* | (2006.01) | |
| *F16F 1/377* | (2006.01) | |
| *A47K 5/12* | (2006.01) | |
| *F16F 1/44* | (2006.01) | |

(52) U.S. Cl.
CPC .......... *F16F 1/3732* (2013.01); *A47K 5/1205* (2013.01); *B05B 11/0037* (2013.01); *B05B 11/3001* (2013.01); *F16F 1/3605* (2013.01); *F16F 1/377* (2013.01); *F16F 1/44* (2013.01); *F16F 1/36* (2013.01); *F16F 1/373* (2013.01)

(58) Field of Classification Search
CPC .... F16F 1/377; F16F 1/373; F16F 1/44; F16F 1/3732; F16F 1/3605; F16F 1/36; A47K 5/1205; B05B 11/0037; B05B 11/3001
See application file for complete search history.

(56) References Cited

U.S. PATENT DOCUMENTS

| | | | | |
|---|---|---|---|---|
| 3,452,905 A | * | 7/1969 | Micallef | B05B 11/3028 222/207 |
| 5,518,377 A | * | 5/1996 | Bougamont | B05B 11/007 222/321.3 |
| 6,223,954 B1 | * | 5/2001 | Carow | B05B 11/3052 222/321.7 |
| 8,474,664 B2 | * | 7/2013 | Ophardt | A47K 5/14 222/190 |
| 9,539,597 B2 | * | 1/2017 | Ding | B05B 11/3002 |

* cited by examiner

*Primary Examiner* — Frederick C Nicolas
(74) *Attorney, Agent, or Firm* — Barlow Josephs and Holmes Ltd

(57) ABSTRACT

A dispensing pump includes a polymer compression spring assembly. The dispensing pump includes a pump base, and a dispensing head having a piston stem. The polymer compression spring assembly includes a slotted tubular spring element and first and second loading cones received at opposing ends of the slotted tubular spring element. The first loading cone is fixed relative to the pump base while the second loading cone is axially movable with the piston stem and dispensing head. The tubular spring element is disposed coaxially about the piston stem between the cones. When the dispensing head is compressed, the loading cones axially compress toward each other whereby the slotted tubular spring element radially expands to create an opposing contraction force, and in turn, an axial extension force. When released, the spring element elastically contracts to its at rest shape, returning the loading cones and dispensing head to their at rest positions.

20 Claims, 25 Drawing Sheets

DISPENSING PUMP WITH POLYMER COMPRESSION SPRING ASSEMBY

BACKGROUND OF THE INVENTION

(1) Field of the Invention

The present invention generally relates to dispensing pumps for liquids, viscous flowable materials, foams, gels, etc. and more particularly to a dispensing pump with a polymer compression spring assembly.

(2) Description of Related Art

Dispensing pumps for various liquids, lotions, foams, gels, etc. are known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion outwardly through the nozzle. When the nozzle is released, the spring forces the nozzle portion back to its normal resting position. Most of the pump system components are typically formed from polymer materials, with the exception of the spring, which is typically formed from metal. The plastic pump components are easily recyclable. However, the presence of the metal spring in the pump assemblies has been found to impede or slow the recycling process due to the need to separate the metal spring from the other plastic components. Accordingly, there is a need in the industry for dispensing pump systems including all plastic spring assemblies.

SUMMARY OF THE INVENTION

Exemplary embodiments of a dispensing pump for liquids, viscous materials, foams, gels, etc. include a polymer compression spring assembly allowing the pump to be more easily recycled. The dispensing pump includes a pump base, and a dispensing head having an associated piston stem. The polymer compression spring assembly includes a slotted tubular spring element formed from a tensile polymer material and first and second loading cones received at opposing first and second ends of the slotted tubular spring element. The piston stem extends coaxially through the first loading cone, which is fixed on or in the pump base, and the second loading cone, which is axially movable with the piston stem and dispensing head. The tubular spring element is disposed coaxially about the piston stem between the first and second loading cones. When the dispensing head is compressed, the loading cones are axially compressible toward each other within the slotted tubular spring element whereby the slotted tubular spring element radially expands in tension to create an opposing radial contraction force, and in turn, an axial extension spring force. When released, the spring element elastically returns to its normal at rest shape, returning the loading cones and dispensing head to their normal at rest positions.

An exemplary embodiment of a compression spring assembly according to the present invention includes a slotted tubular spring element formed from a tensile polymer material, and first and second loading cones received at opposing first and second ends of the slotted tubular spring element. In some embodiments, both the spring element and the loading cones may be formed from polymer materials, making the spring assembly more easily recyclable.

In the exemplary embodiment, the slotted tubular spring element is cylindrical in shape and has a uniform wall thickness. The loading cones are generally conical in shape and preferably have at least one wall section with a wall angle of no less than 11 degrees. Wall angles of less than 11 degrees tend to create a friction lock while wall angles of greater than 11 degrees minimize stroke length and increase overall spring assembly diameter. The exemplary embodiment includes loading cones with a first frustoconical preloading wall section having a wall angle of greater than 11 degrees, and a second frustoconical primary loading wall section having a wall angle of 11 degrees.

The loading cones are axially compressible toward each other within the open ends of the slotted tubular spring element whereby the slotted tubular spring element radially expands in tension to create an opposing radial contraction force. Deformation of the tubular spring walls elastically stores energy which will return the spring to its normal at rest shape when released. When released, the spring element elastically contracts, in turn creating an axial extension force, and returns the cones to their normal at rest positions.

Some embodiments of the spring assembly include a modified spring element having strain reducing ribs extending along the opposing edges of the longitudinal slot. The ribs may include outwardly convex surfaces extending both radially outward and circumferentially outward from the slot edges. This embodiment further includes a first thinner wall thickness at the slot edges and a second thicker wall thickness diametrically opposed from the slot edges. The arcuate surface along with the increasing wall thickness moving away from the slot edges, more evenly distributes strain throughout the spring element and extends the life cycle of the spring element.

Other embodiments of the spring assembly include a spring element which is hyperboloid in shape.

In some exemplary embodiments, all of the components of both the dispensing pump and the compression spring assembly are molded from the same plastic material making the entire dispensing pump easily recyclable in a single plastic material classification. Exemplary plastic materials include polypropylene (PP), high-density polyethylene (HDPE), and low-density polyethylene (LDPE). However, the disclosure should not be considered to be limited to these materials.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
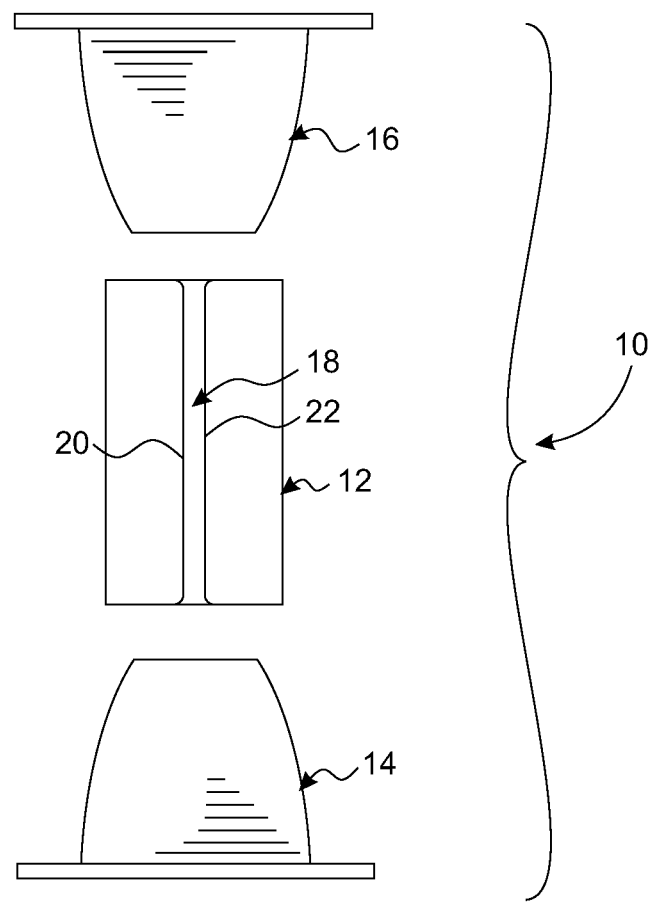
FIG. 1 is a plan view of an exemplary compression spring assembly in accordance with the present invention.

Referring now to the drawings, an exemplary embodiment of the present compression spring assembly is generally indicated at 10 in FIG. 1-12. According to the present invention, the compression spring assembly 10 comprises a slotted tubular spring element 12 formed from a tensile polymer material, and first and second loading cones 14, 16 received at opposing first and second ends of the slotted tubular spring element 12. In some embodiments, the loading cones 14, 16 may be formed from non-plastic materials, depending on the implementation. However, in the preferred embodiments as disclosed herein, both the spring element 12 and the loading cones 14, 16 are formed from polymer materials. Exemplary plastic materials include polypropylene (PP), high-density polyethylene (HDPE), and low-density polyethylene (LDPE). However, the disclosure should not be considered to be limited to these materials. In particular, the various components may be molded from HDPE and/or LDPE, making the entire spring assembly more easily recyclable.

Figure 2:
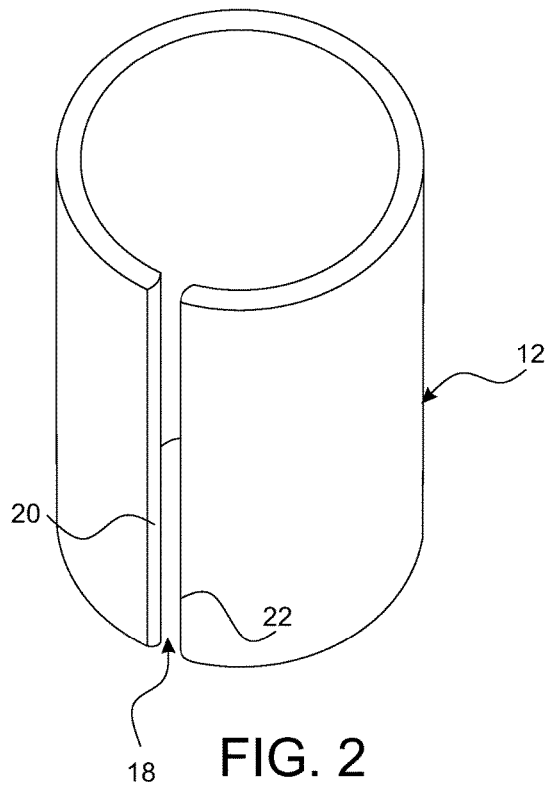
FIG. 2 is a perspective view of the slotted tubular spring element in an at rest condition.
Figure 3:
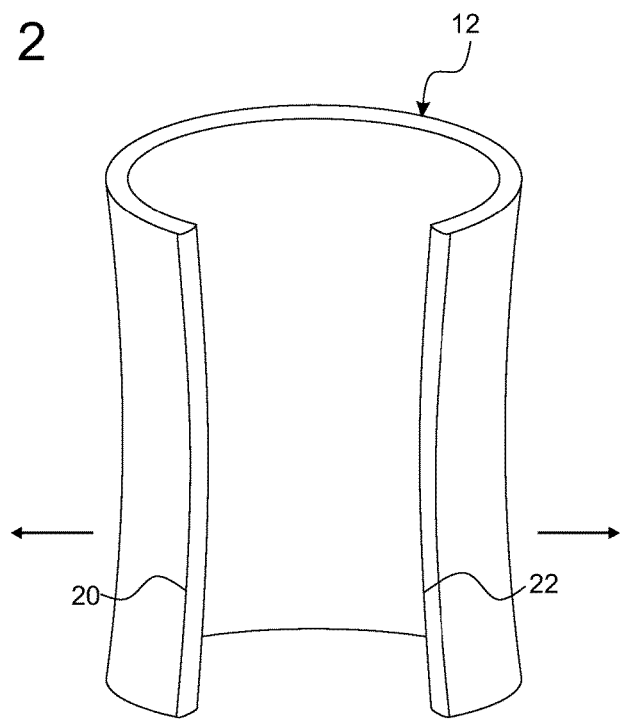
FIG. 3 is a perspective view of the slotted tubular spring element in a radially expanded condition.
Figure 4:
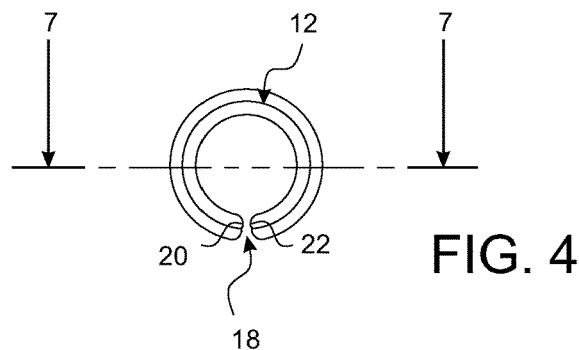
FIG. 4 is a top view of the spring element.
Figure 5:
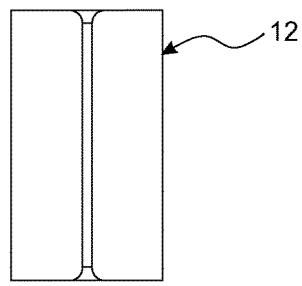
FIG. 5 is a front view thereof.
Figure 6:
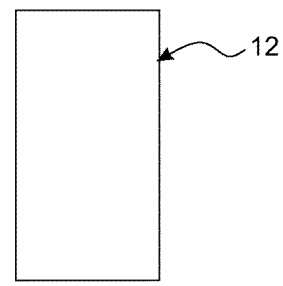
FIG. 6 is a side view thereof.
Figure 7:
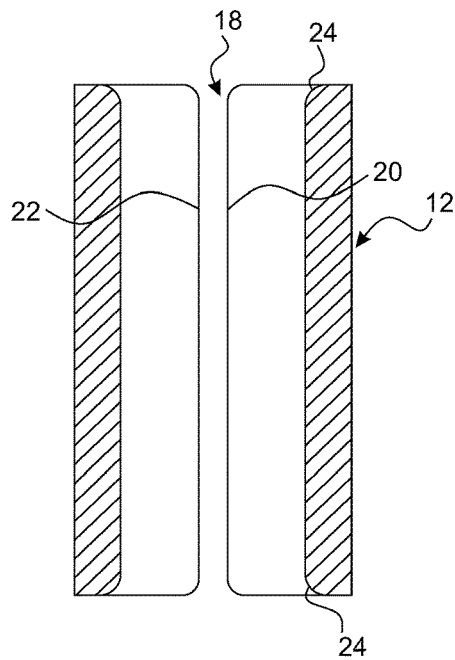
FIG. 7 is a cross-section view thereof taken along line 7-7 of FIG. 4.

In the exemplary embodiment, the slotted tubular spring element 12 is cylindrical in shape and has a uniform wall thickness (best illustrated in FIGS. 2 and 4). The spring element 12 includes a single longitudinal slot 18 which extends the entire length of the tube to define parallel opposing slot edges 20, 22. The slot 18 allows the element 12 to expand radially upon the application of an axial force at the first and second ends thereof. The inner wall edges are chamfered 24 to facilitate sliding of the walls over the loading cone surfaces 14, 16 (best illustrated in FIG. 7).

Figure 8:
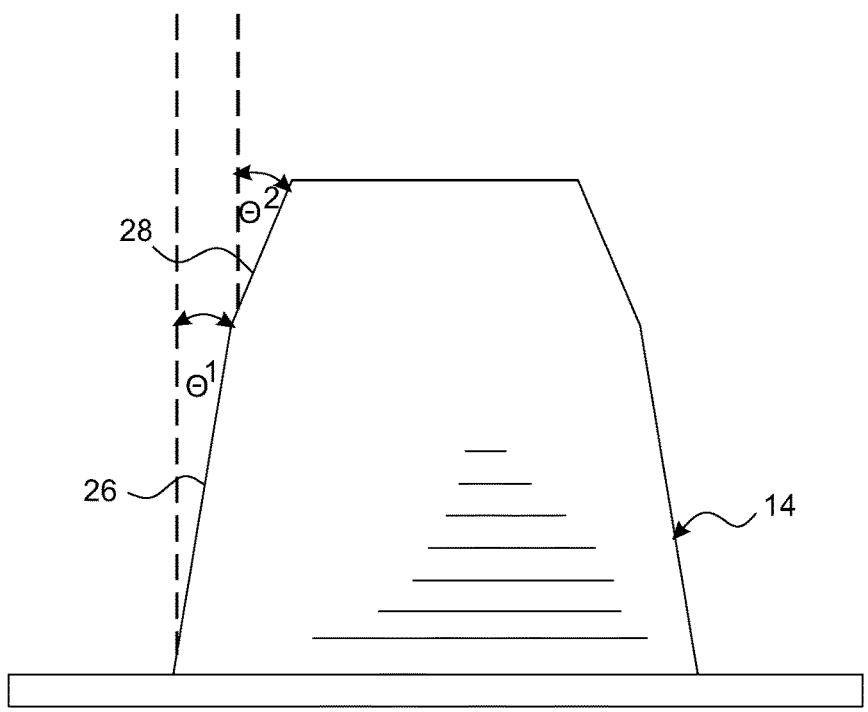
FIG. 8 is an enlarged plan view of the loading cone.

The loading cones 14, 16 are identical in shape and are symmetrically inverted to provide opposing axial compression and extension forces on the tubular spring element 12. Referring to FIG. 8, the loading cones 14, 16 (only 14 is shown) are generally conical in shape and preferably have at least one wall section (primary loading wall) 26 with a wall angle $\theta^1$ of no less than 11 degrees. In the present embodiment, a wall angle of less than 11 degrees tends to create a friction lock while a wall angle of greater than 11 degrees minimizes stroke length and increases overall spring assembly diameter. It should be understood that the critical wall angle for the primary loading wall 26 is based on the type of material used, i.e. polymer or metal, and other factors such as surface finish, shape of wall chamfers, etc. The angle must be selected such that the spring force from the spring element 12 overcomes friction as well as displacement of the applied axial load. The exemplary embodiment, which has an intended use in dispensing pumps for viscous liquids, includes loading cones 14, 16 with a first frustoconical pre-loading wall section 28 having a wall angle $\theta^2$ of greater than 11 degrees, and a second frustoconical primary loading wall section 26 having a wall angle $\theta^1$ of 11 degrees. The steeper pre-load angle $\theta^2$ facilitates the initial expansion of the spring element 12.

Figure 9:
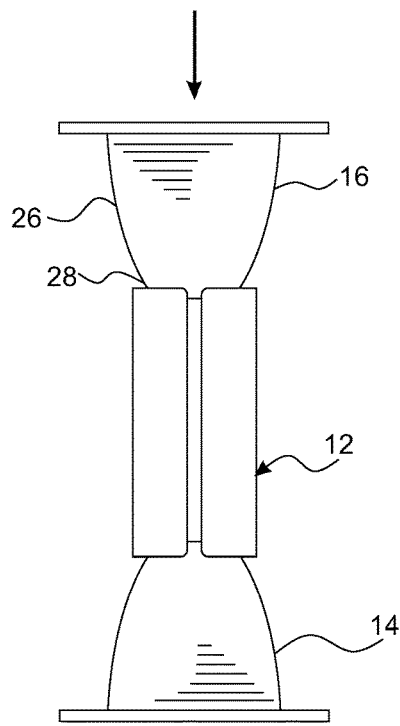
FIGS. 9-12 are sequential views of the compression spring assembly being axially loaded and released.
Figure 10:
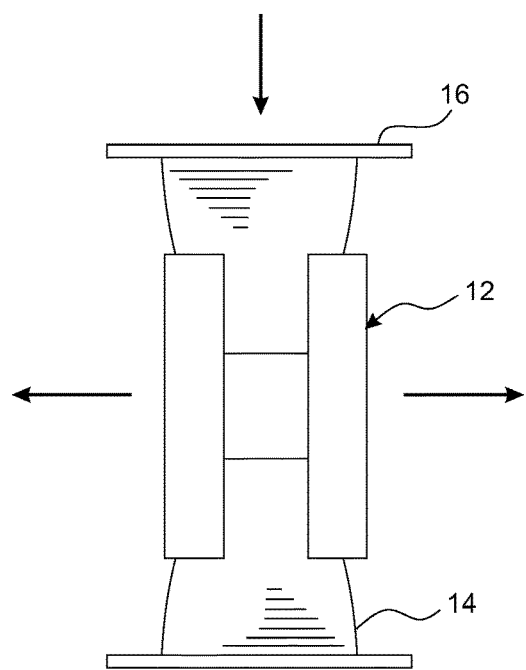
Figure 11:
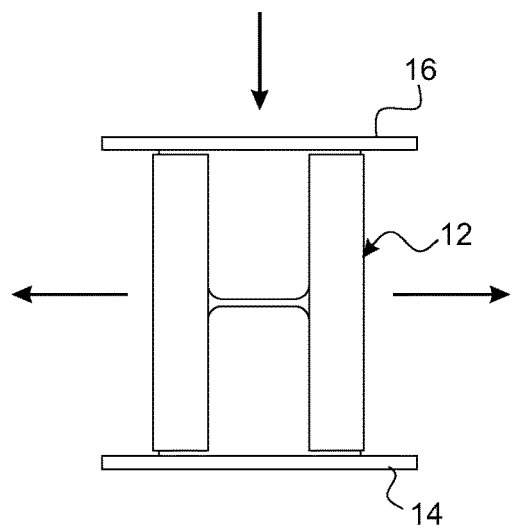
Figure 12:
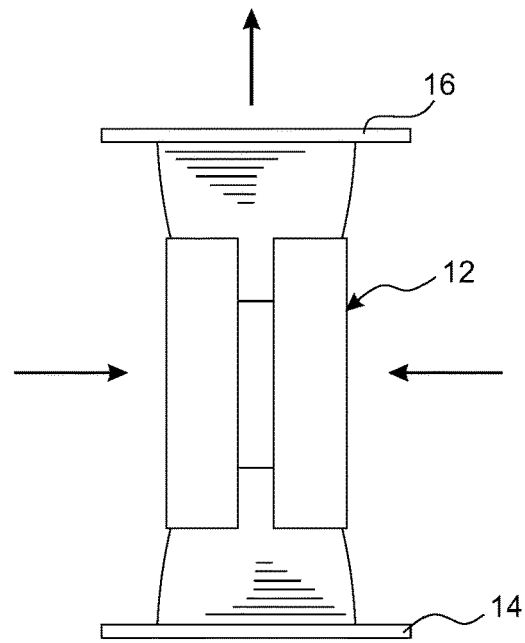

Turning to FIGS. 9-12, the loading cones 14, 16 are axially compressible toward each other within the open ends of the slotted tubular spring element 12 whereby the slotted tubular spring element 12 radially expands in tension to create an opposing radial contraction force. FIG. 9 illustrates an initial at rest state. FIG. 10 illustrates initial pre-load and outward expansion of the spring element. FIG. 11 illustrates full axial compression and load. Deformation of the tubular spring element 12 elastically stores energy which will return the spring element 12 to its normal at rest shape when released. When released as illustrated in FIG. 12, the spring element 12 elastically contracts (inward), in turn creating an axial extension force, and returns the cones 14, 16 to their normal at rest positions.

Figure 13:
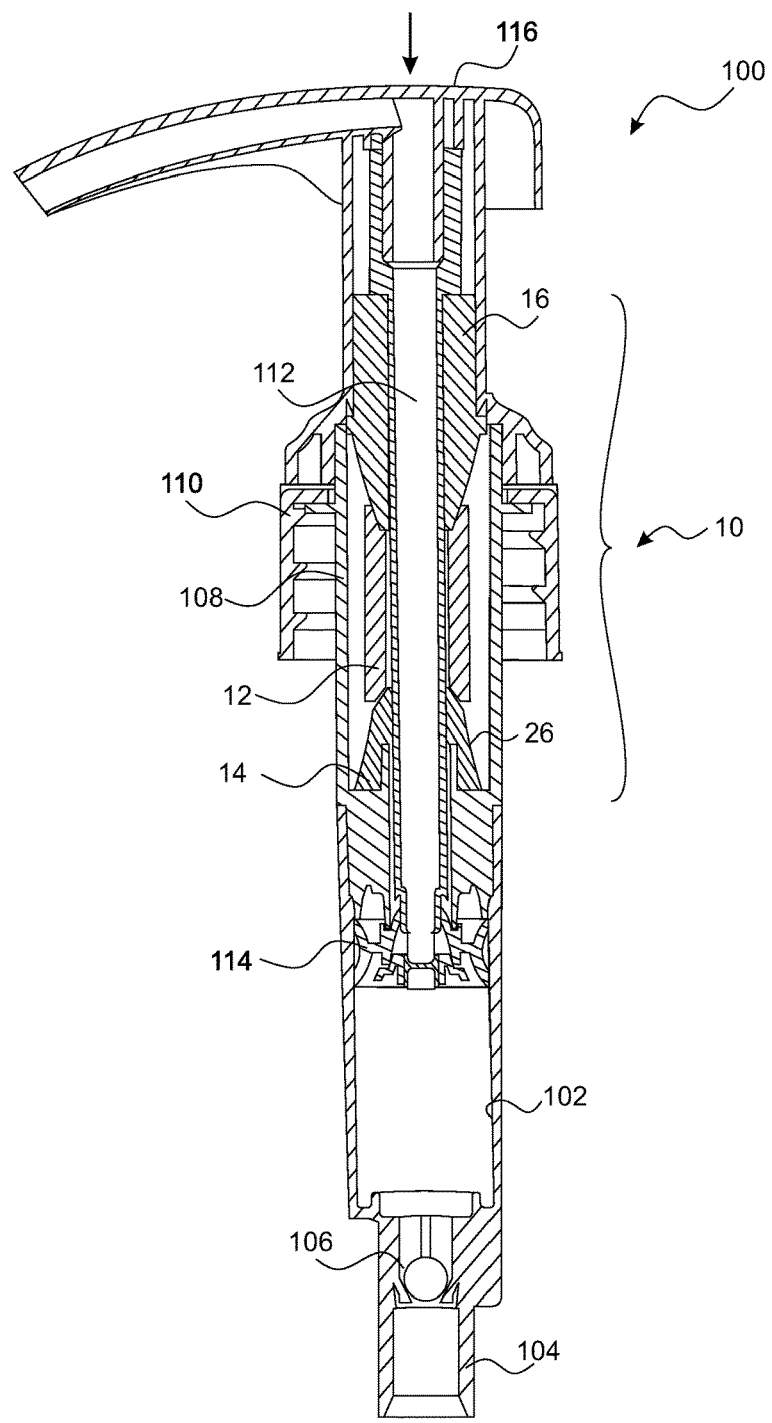
FIG. 13 is a cross-sectional view of an exemplary dispensing pump incorporating the present compression spring assembly.
Figure 14:
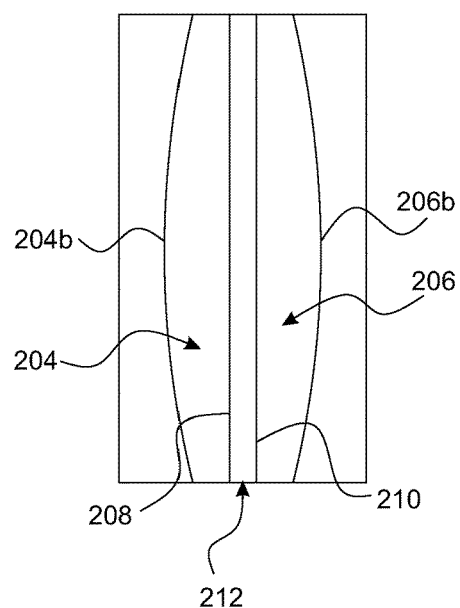
FIG. 14 is a front view of another exemplary embodiment of the slotted tubular spring element including strain reducing ribs.
Figure 15:
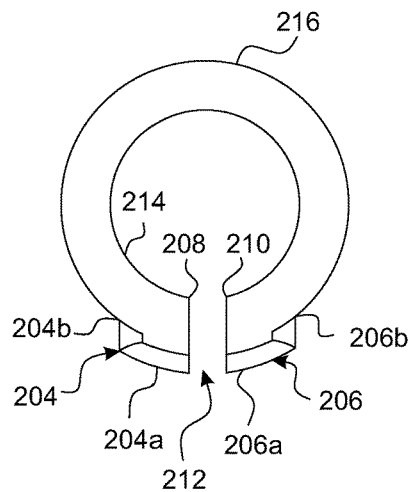
FIG. 15 is a top view thereof.
Figure 16:
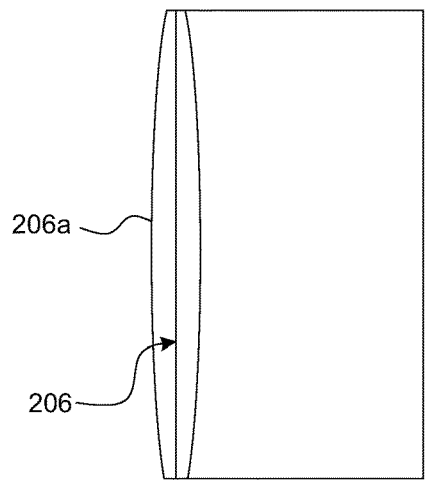
FIG. 16 is a side view thereof.

Turning to FIG. 13, embodiments of the present polymer compression spring 10 may be advantageously used in a dispensing pump 100 for various liquids, lotions, etc. contained within a bottle or other container (not illustrated). In some exemplary embodiments, all of the components of both the dispenser pump 100 and the compression spring assembly 10 are molded from the same plastic material making the entire dispensing pump 100 including the spring assembly 10 easily recyclable in a single plastic material classification.

The dispensing pump 100 comprises an accumulator cup 102 having a dip tube receptacle 104 and ball valve 106 at a lower end thereof. A tubular guide 108 is received in the upper end of the accumulator cup 102, and the tubular guide 108 is secured on a container neck (not shown) with a threaded cap ring 110. The present compression spring assembly 10 is received and guided within the tubular guide 108. As noted above, the angle $\theta^1$ of the loading wall 26 of the loading cones 14, 16 is a critical factor in determining overall spring assembly diameter. As seen in this pump embodiment 100, the spring assembly 10 fits within the inner walls of the guide 108 which in turn must fit within the neck of the container. Accordingly, the wall angle, spring element material and profile are all factors in determining this specification. A piston rod 112 is received axially through the loading cones 14, 16 and the tubular spring element 12 and extends through the bottom of the guide 108 into the accumulator cup 102 wherein the terminal end is fitted with a piston 112 which forms a seal with the inner wall of the accumulator 102. A nozzle head 116 is secured to the upper end of the piston rod 112 and received over the upper loading cone 16.

In operation, a forcible downward compression of the nozzle head 116 causes a corresponding downward axial movement of the upper loading cone 16 and outward deflection and loading of the spring element 12 as per the illustrations earlier described in FIGS. 9-12. Upon the subsequent release of the nozzle head 116, the tubular spring element 12 elastically contracts back to its normal at rest shape and position (see also FIG. 12), causing a forcible upward movement of the upper loading cone 16, piston rod 112, piston 114 and nozzle head 116 back to their normal at rest positions. The pump assembly 100 and ball valve 106 operate as known in the art to draw material up from the dip tube 104 and dispense the material through the nozzle head 116.

Figure 17:
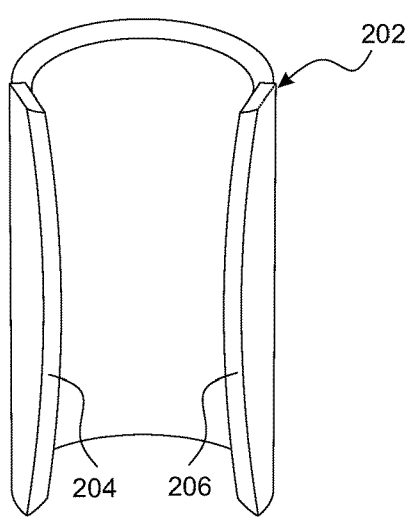
FIG. 17 is a perspective view thereof in a radially expanded condition.
Figure 18:
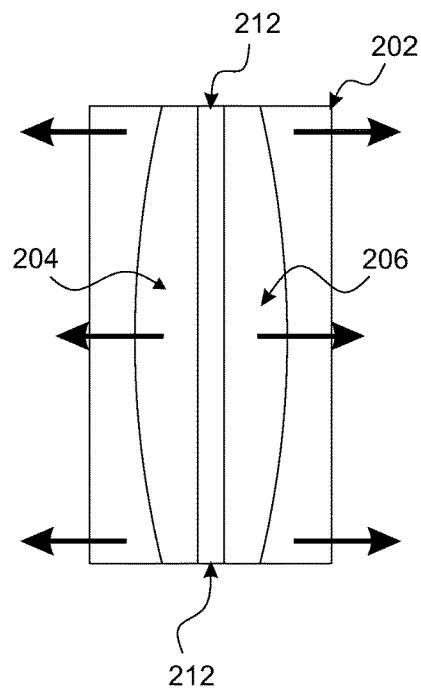
FIGS. 18 and 19 are side and front views thereof showing the bending vectors of the ribs when the spring element is expanded.
Figure 19:
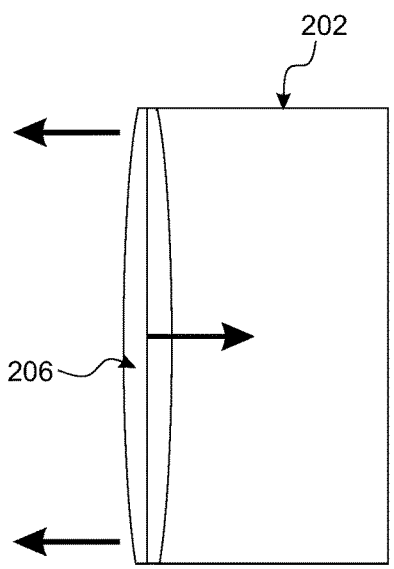
Figure 20:
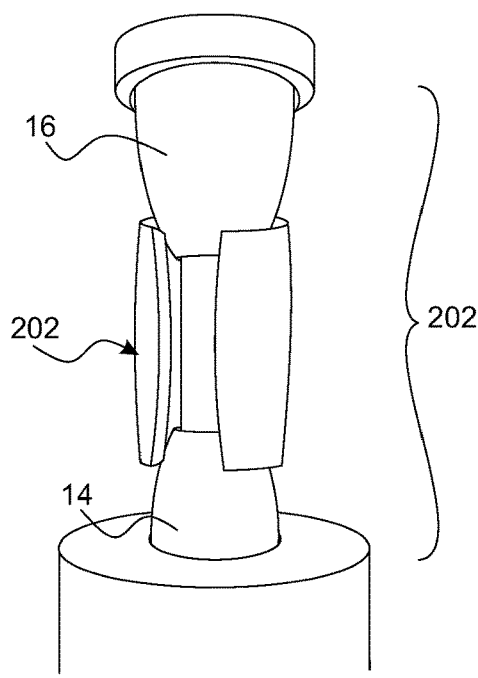
FIG. 20 is an illustration showing initial axial compression of the spring assembly.
Figure 21:
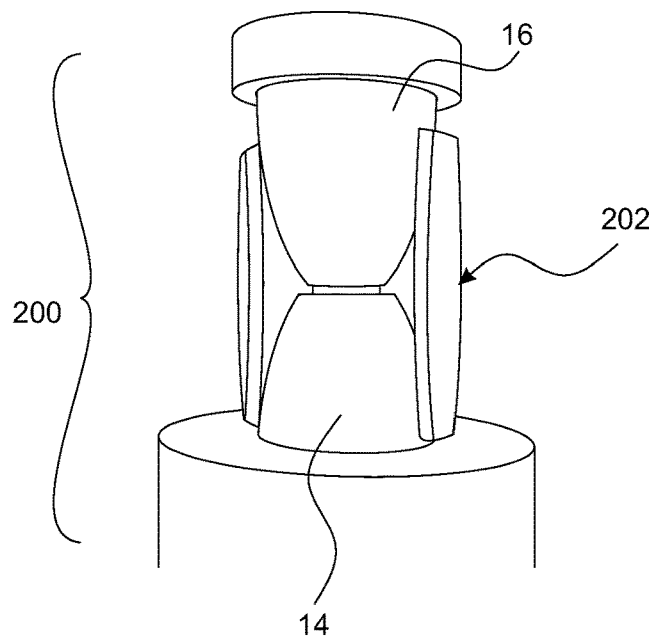
FIG. 21 is another illustration showing full axial compression of the spring assembly.

Turning now to FIGS. 14-21, some embodiments of the spring assembly 200 may include a modified slotted tubular spring element 202 having strain reducing ribs 204, 206 extending along the opposing edges 208, 210 of the longitudinal slot 212. The ribs 204, 206 may include symmetrical convex surfaces extending both radially outward 204a, 206a (See FIGS. 15 and 16) and circumferentially outward 204b, 206b (See FIG. 14) from the slot edges 208, 210. This embodiment 202 further includes a first thinner wall thickness 214 at the slot edges 208, 210 adjacent the strain ribs 204, 206 and a second thicker wall thickness 216 diametrically opposed from the slot edges 208, 201 (See FIG. 15). The arcuate surfaces 204a, 204b, 206a, 206b along with the increasing wall thickness moving away from the slot edges 208, 210 more evenly distributes strain throughout the entire spring element 202 and extends the life cycle of the spring element 202. FIG. 17 illustrates the spring element 202 in an expanded loaded state. FIGS. 18 and 19 illustrate the movement vectors (arrows) associated with the corners of the slot edges 208, 210. The reduced material volume in these areas allow these corners to more easily deform and reduce strain. The present spring element 202 is used in combination with the same loading cones 14, 16 as previously described. FIGS. 20 and 21 show axial compression of the present embodiment 200 with exemplary loading cones 14, 16. The present spring assembly 200 can be used in the same types of dispensing pumps 100 as described above with improved spring longevity.

Figure 22:
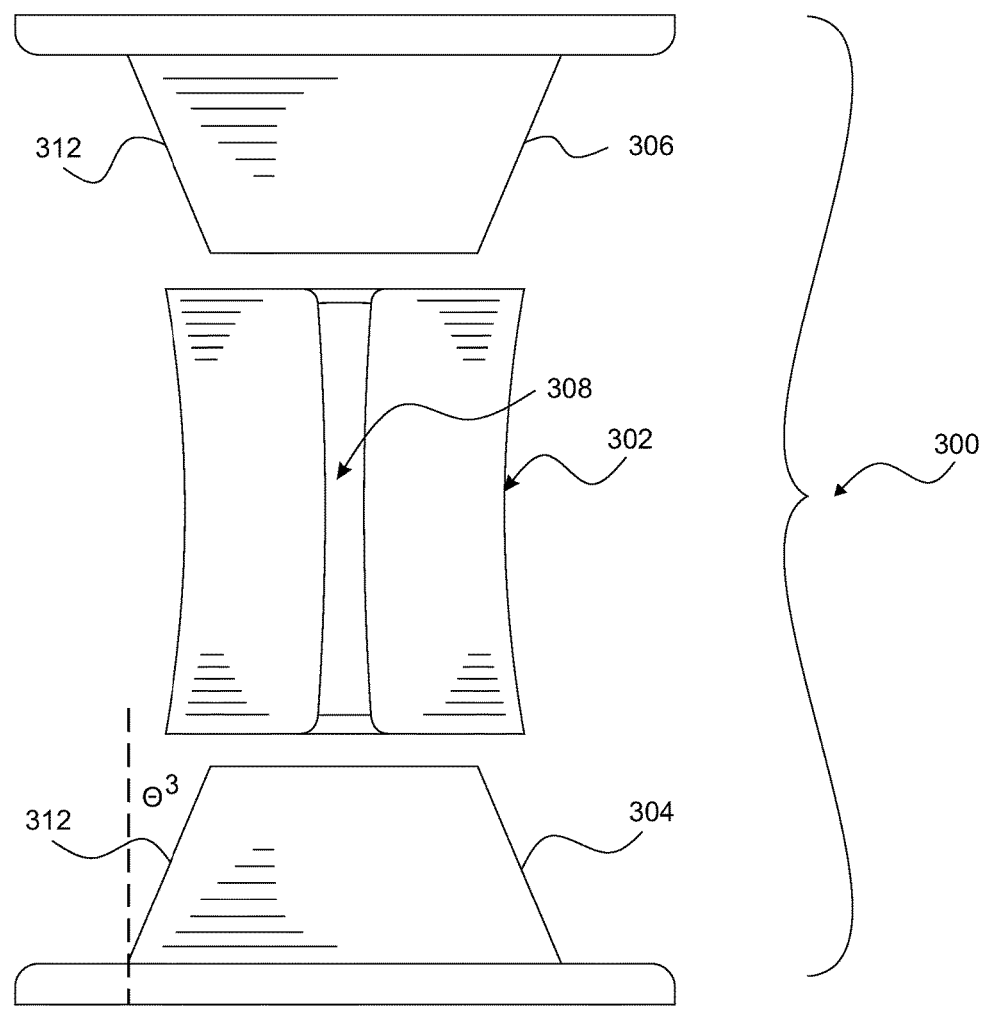
FIG. 22 is a plan view of another exemplary compression spring assembly including a hyperboloid spring element.
Figure 23:
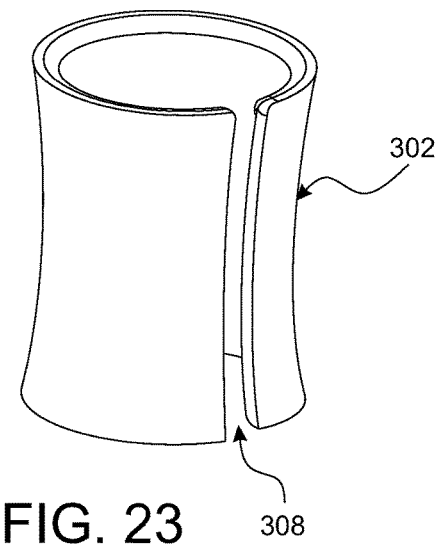
FIG. 23 is a perspective view of the hyperboloid slotted spring element.
Figure 24:
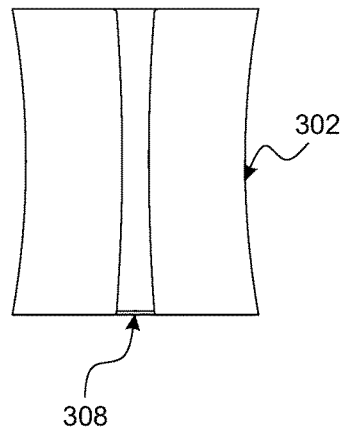
FIG. 24 is a front view thereof.
Figure 25:
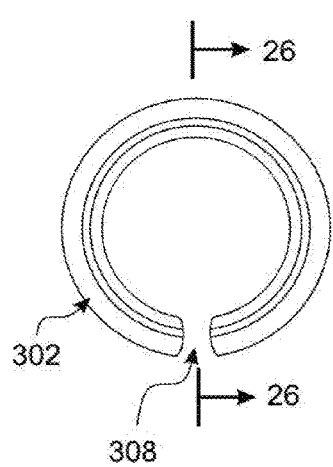
FIG. 25 is a top view thereof.
Figure 26:
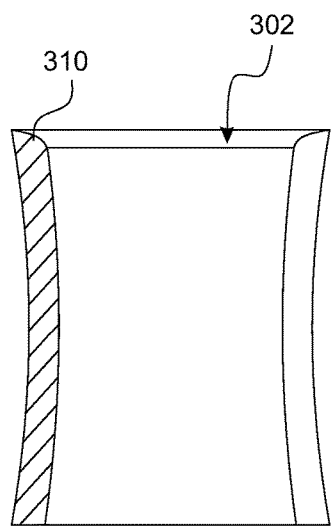
FIG. 26 is a cross-sectional view thereof taken along line 26-26 of FIG. 25.

Referring now to FIGS. 22-28, other embodiments of the compression spring assembly 300 include a slotted tubular spring element 302 which is hyperboloid in shape, i.e. having a smaller (narrower) diameter at the center and symmetrically larger diameters at the ends, and first and second opposed loading cones 304, 306. The spring element 302 has a uniform wall thickness (See FIGS. 25 and 26) and includes a single longitudinal slot 308 (FIGS. 23 and 24) which extends the entire length of the tube, allowing the spring element 302 to expand radially upon the application of an axial force at the first and second ends thereof. The curved spring wall of the hyperboloid spring 302 is provides a stiffer loading profile (higher loading profile) using the same amount of plastic material as compared with the earlier described cylindrical shape (FIGS. 1-12). The inner wall edges are also chamfered 310 to facilitate sliding of the spring element 302 over the loading cone wall surfaces 304, 306 (See FIG. 26). The hyperboloid shape of the spring element 302 works more efficiently with loading cones 304, 306 having a single frustoconical loading wall 312 with a somewhat steeper wall angle $\theta^3$ (FIG. 22). The preferred embodiment as illustrated shows a wall angle $\theta^3$ of greater than 11 degrees. As noted above, the particular wall angle $\theta$ is selected based on the tensile characteristics of the spring element 302 as well as material and surface finishes. The exemplary embodiments are intended to be illustrative but not limiting.

Figure 27:
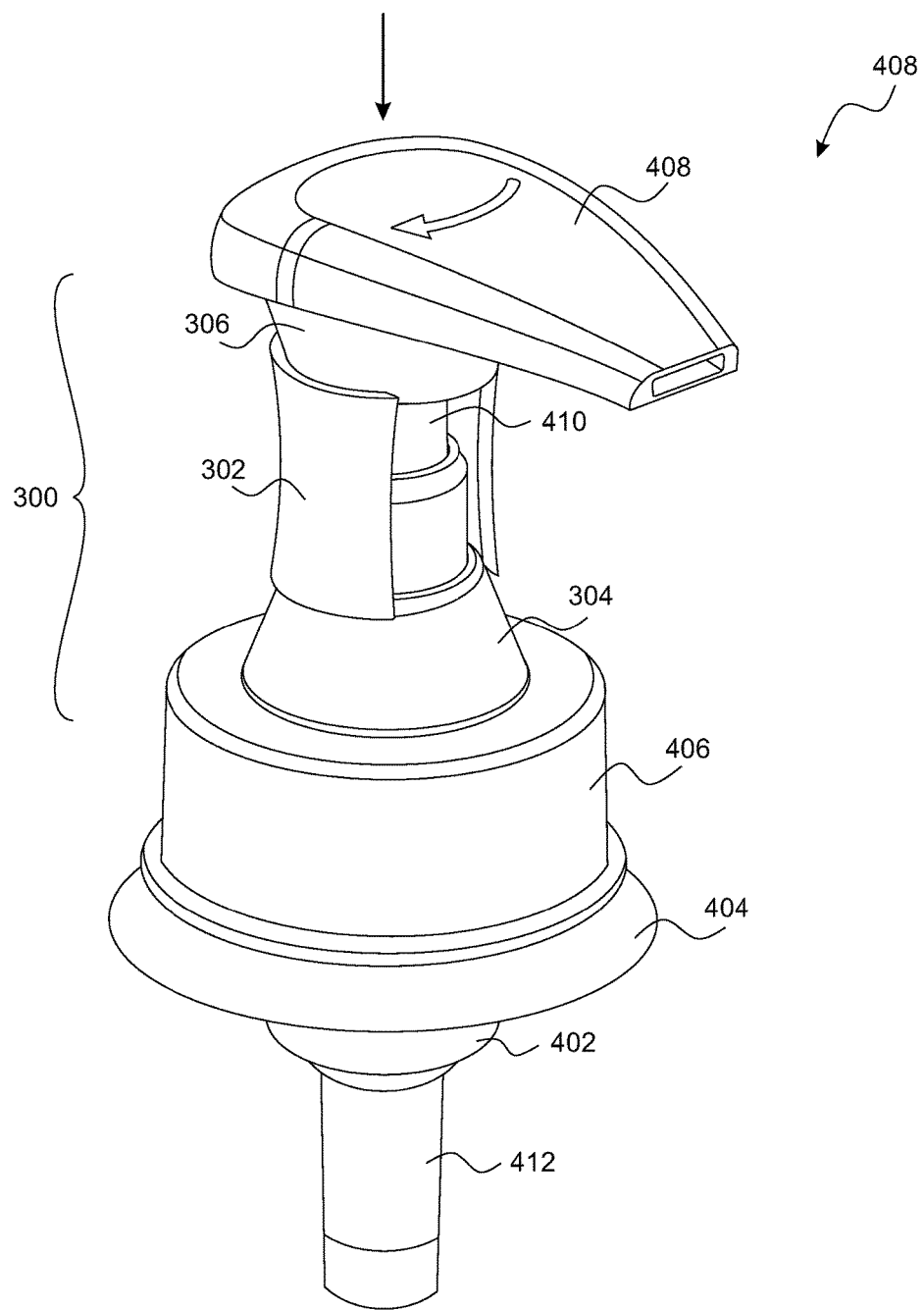
FIG. 27 is a perspective view of an exemplary dispensing pump incorporating a hyperboloid compression spring assembly.
Figure 28:
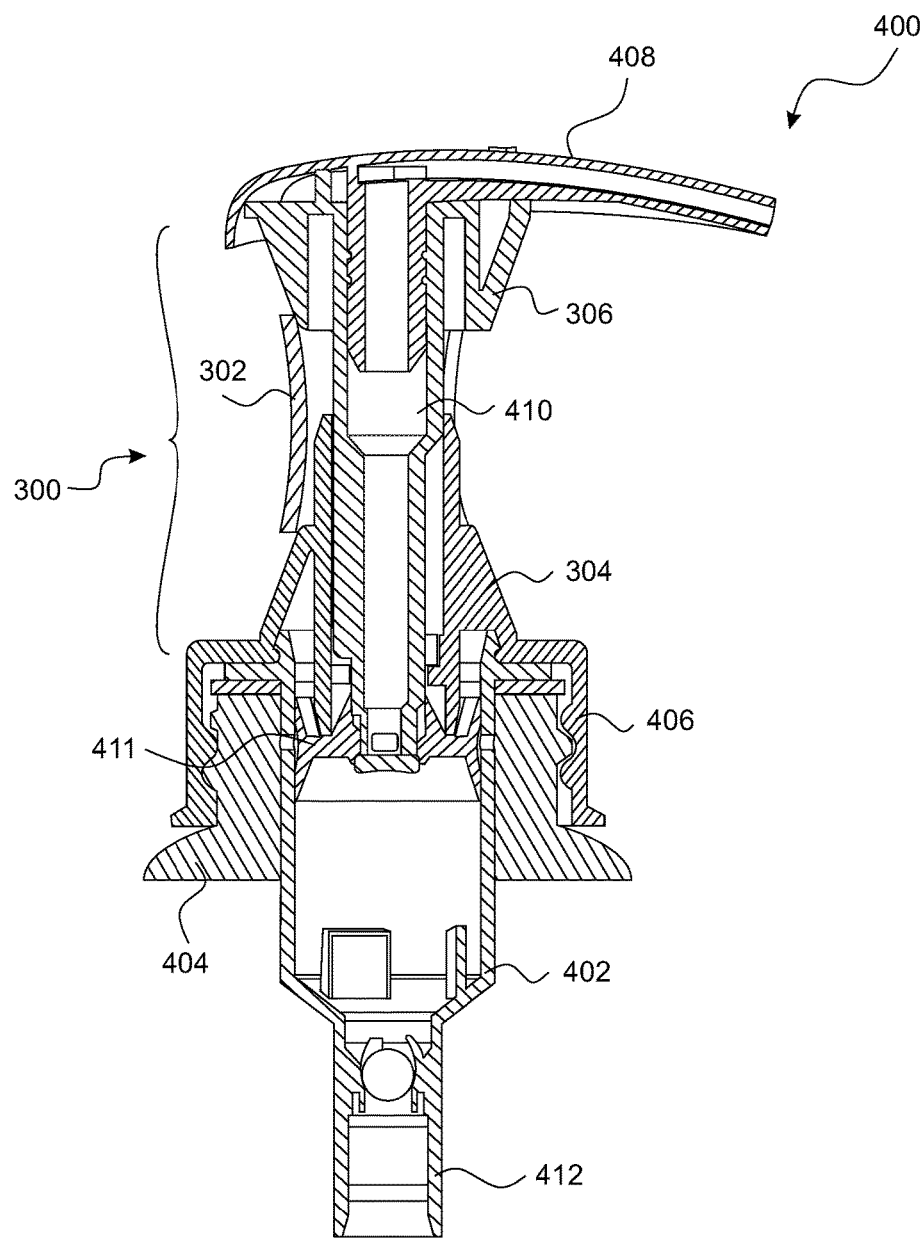
FIG. 28 is a cross-sectional view thereof taken along line 28-28 of FIG. 27.

Turning to FIGS. 27 and 28, the present hyperboloid compression spring assembly 300 lends itself to be advantageously used as an exterior spring return in certain dispensing pumps 400 for various liquids, lotions, etc. As described above, in many exemplary embodiments, all of the components of both the dispenser pump 400 and the compression spring assembly 300 are molded from the same plastic material making the entire dispensing assembly easily recyclable in a single plastic material classification.

Referring to FIGS. 27-28, the dispensing pump 400 comprises an accumulator cup 402 which is secured within the neck of a container 404 with a threaded closure 406. A nozzle head 408 is received on a piston stem 410 which extends through the closure 406 and into the accumulator 402. A piston seal 411 is received on the terminal end of the piston stem 410, forming a seal with the inner walls of the accumulator. The loading cones 304, 306 of the present hyperboloid compression spring assembly 300 are integrated into the opposing exterior surfaces of the closure 406 and the top end of the piston stem 410 and the hyperboloid slotted tubular spring element 302 is snap received over and around the piston stem 410 and upward cone extension 304 of the closure 406 so that it engages the ramped loading cone walls 304, 306 of the piston stem 410 and closure 406.

In operation, a forcible downward compression of the nozzle head 408 causes a corresponding downward axial movement of the upper loading cone (piston stem head) 410/306 and outward deflection and loading of the spring element 302 similar to the illustrations earlier described in FIGS. 9-12. Upon the subsequent release of the nozzle head 408, the tubular spring element 302 elastically contracts (radially inward) back to its normal at rest shape and position, causing a forcible upward movement of the upper loading cone (piston stem) 410/306 and nozzle head 408 back to their normal at rest positions. The pump assembly 400 operates as known in the art to draw material up from a dip tube connection 412 and dispense the material through the nozzle head 408.

Figure 29:
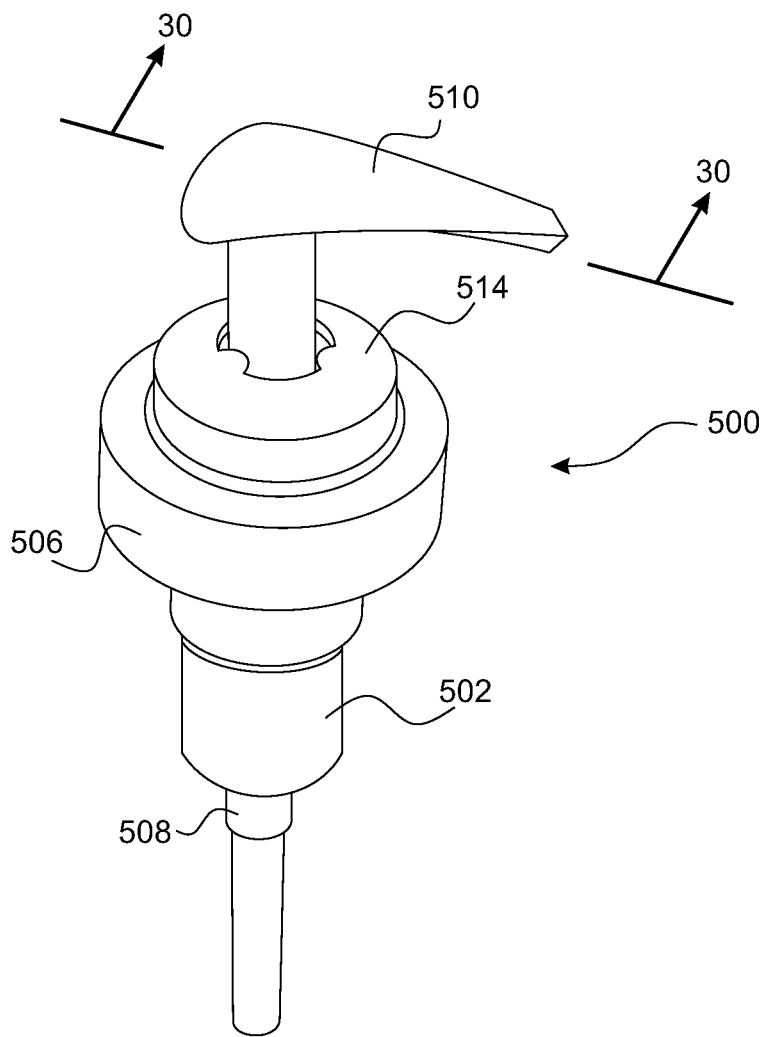
FIG. 29 is a perspective view of another exemplary embodiment.
Figure 30:
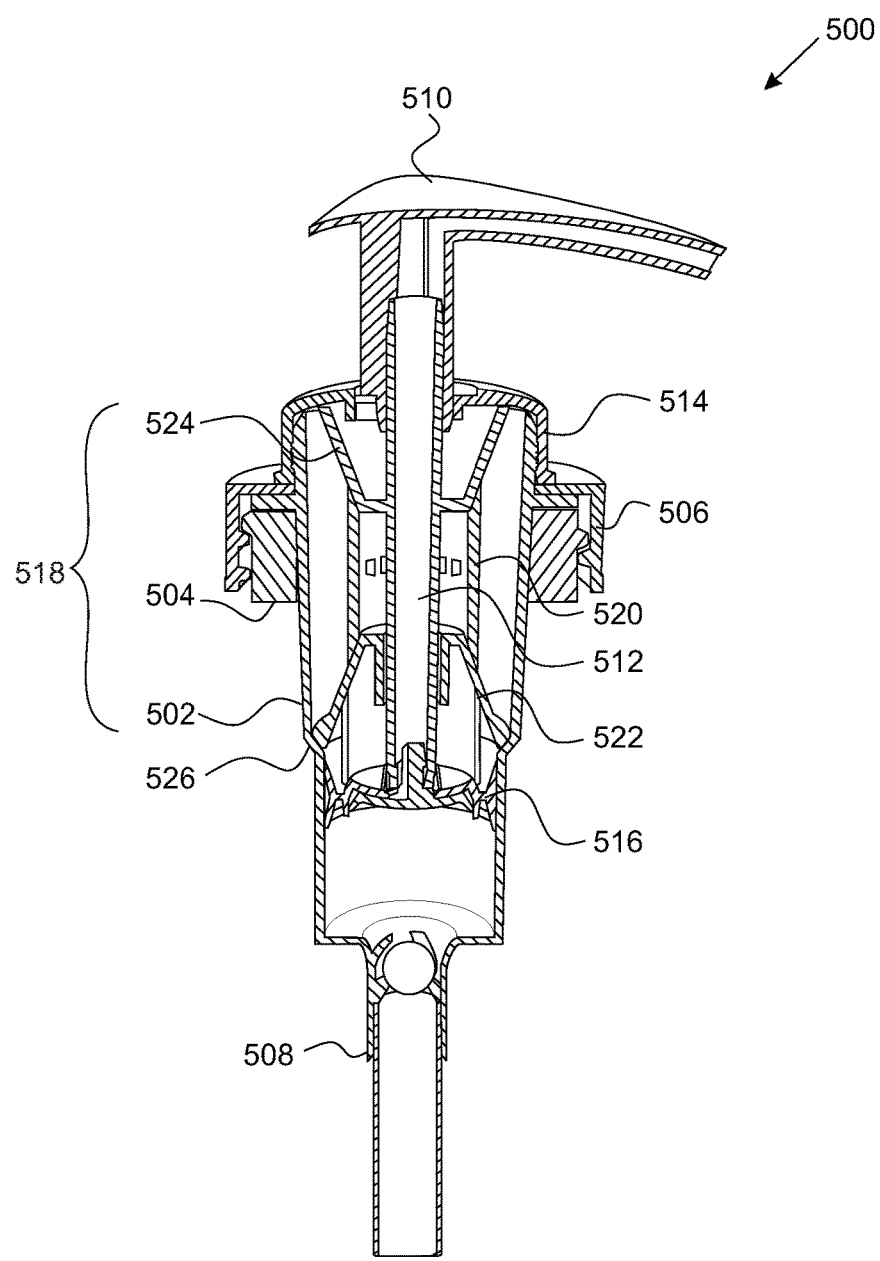
FIG. 30 is a cross-sectional view thereof taken along line 30-30 of FIG. 29.

Referring to FIGS. 29 and 30, another exemplary pump dispenser embodiment is illustrated and generally indicated at 500. The dispensing pump 500 comprises an accumulator 502 which is secured within the neck of a container 504 with a threaded closure 506. The accumulator 502 has a dip tube inlet 508 formed in the bottom wall thereof. A nozzle head 510 is received on a piston stem 512 which extends through a second closure ring 514 secured at the top of the accumulator 502 and into the accumulator 502. A piston seal 516 received on the terminal end of the piston stem 512, forming a seal with the inner walls of the accumulator 502. The compression spring assembly 518 is received within the accumulator 502, similar to the embodiment in FIG. 13, and comprises a cylindrical slotted tubular spring element 520 and first and second loading cones 522, 524. The first loading cone 522 of the present embodiment is an independent component which is seated on a shoulder 526 formed on the accumulator wall. The piston stem 512 extends coaxially through the first loading cone 522 such that the piston seal 516 is located below the first loading cone 522. The second loading cone 524 is integrated into the exterior surface of the piston stem 512. It is noted here that the loading cones 522, 524 have a single uniform loading surface. The slotted tubular spring element 520 is received coaxially around the piston stem 512 and between the first and second loading cones 522, 524.

Operation of the dispensing pump 500 is similar to that described with respect to the embodiment in FIG. 13.

Figure 31:
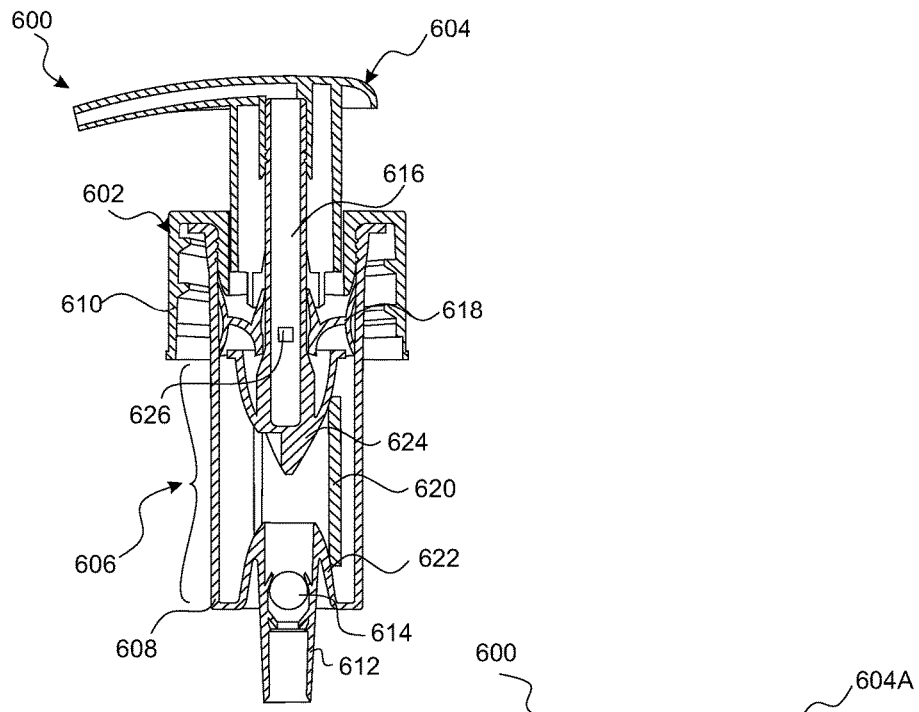
FIGS. 31-34 are cross-sectional views of additional exemplary embodiments.

Referring to FIG. 31, another exemplary embodiment is illustrated and generally indicated at 600. The dispensing pump 600 generally comprises a pump base 602, a dispensing head 604 and a polymer compression spring assembly 606. The pump base includes an accumulator 608 secured within the neck of a container (not shown) with a threaded closure 610. The accumulator 608 has a dip tube inlet 612 formed in the bottom wall thereof and a ball valve 614 is located within the dip tube inlet 612. The dispensing head 604 is received on the top end of a piston stem 616 which extends through the threaded closure 610 and into the accumulator 608. A piston seal 618 is received on the piston stem 616 midway along the length of the piston stem. The compression spring assembly 606 is received within the accumulator 608, and comprises a cylindrical slotted tubular spring element 620 and first and second loading cones 622, 624. The first loading cone 622 of the present embodiment is integrally formed with the bottom wall of the accumulator 608 extending upwardly around the dip tube inlet 612 and ball valve 614. The second loading cone 624 is integrated into the terminal end of the piston stem 616. It is noted here that the piston stem 616 extends coaxially through the piston seal 618 such that the piston seal 618 is located above the second loading cone 624. The loading cones 622, 624 have both a preloading surface and primary loading surface as described hereinabove and better illustrated in FIG. 8. The cylindrical slotted tubular spring element 620 is received within the accumulator 608 between the first and second loading cones 622, 624.

Downward compression of the dispensing head 604 causes a corresponding downward compression of the piston stem 616 and second loading cone 624, and elastic radial expansion of the slotted tubular spring element 620. Material within the accumulator chamber is pumped through a port 626 in the wall of the piston stem 616 into an interior stem passageway and upwardly into the dispensing head 604. As described above, release of the dispensing head 604 frees the spring element 620 to radially contract and create an upward axial force to return the piston stem 616 and dispensing head 604 back to their normal at rest positions.

Figure 32:
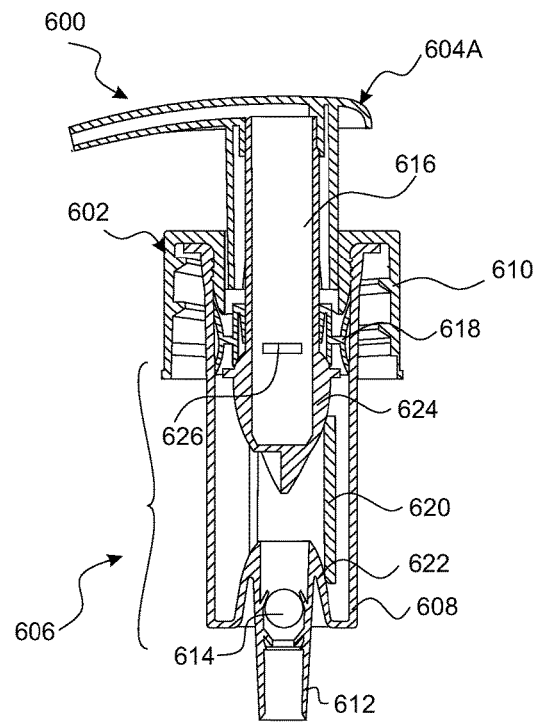

FIG. 32 illustrates a slightly modified embodiment 600A where the interior passage of the piston stem 616 is enlarged to improve material flow.

Figure 33:
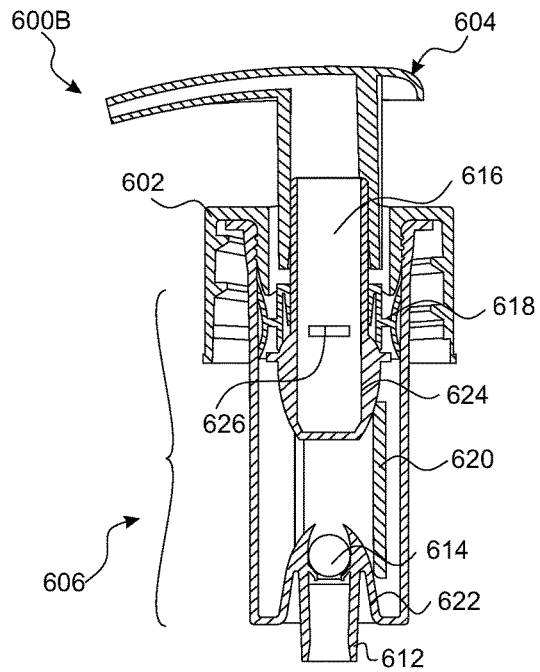

FIG. 33 illustrates another modified embodiment 600B where the tip of second loading cone 624 is truncated and the accumulator 608 is slightly shorter in length.

Figure 34:
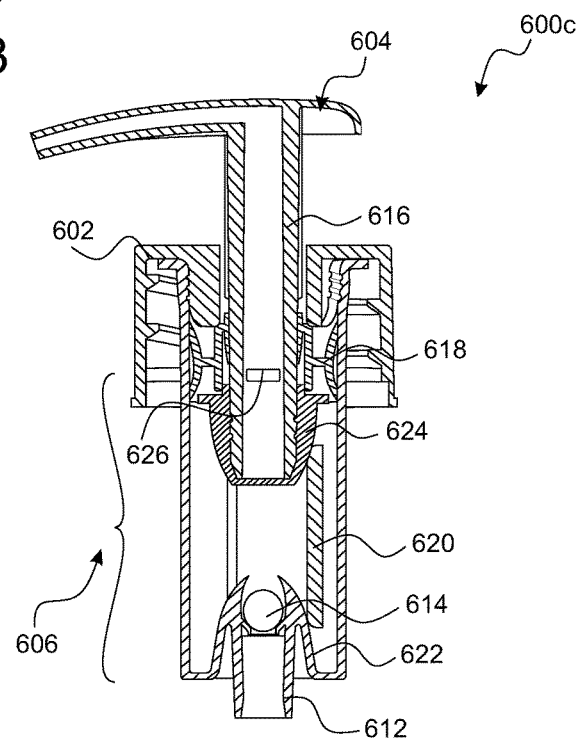
Figure 35:
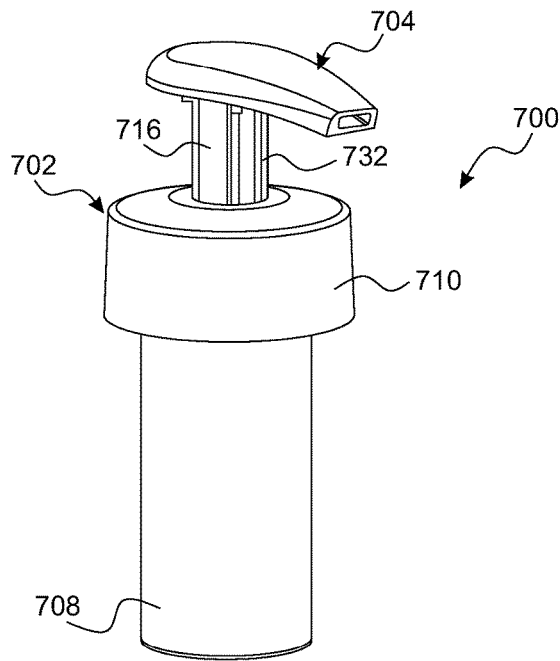
FIG. 35 is a perspective view of a preferred exemplary embodiment.
Figure 36:
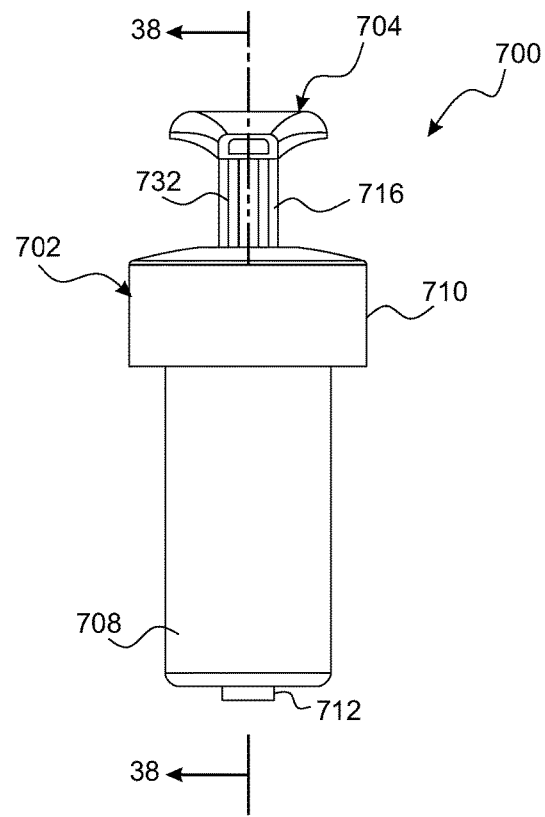
FIG. 36 is a front view thereof.

FIG. 34 illustrates yet another embodiment 600C where the second loading cone 624 is molded as a separate component and secured on a terminal end of the piston stem 616 below the piston seal 618.

Figure 37:
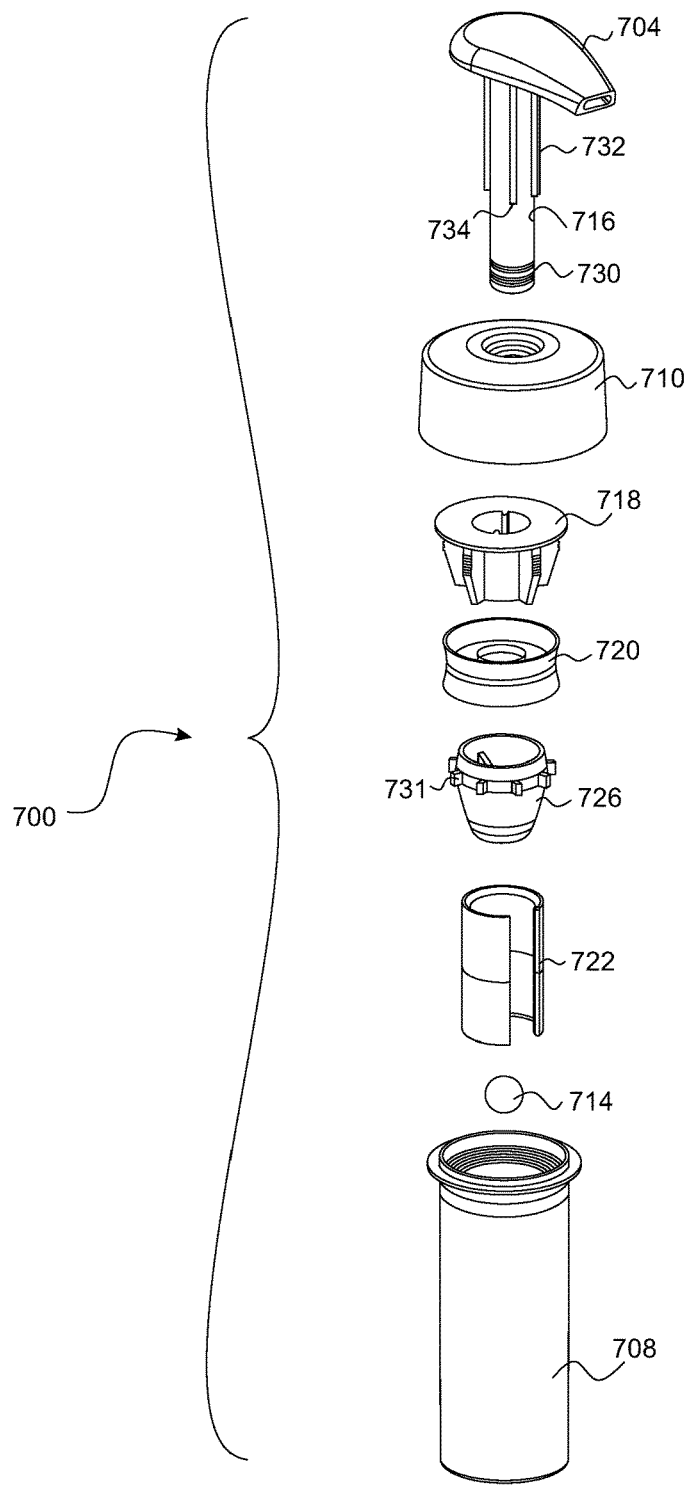
FIG. 37 is an exploded perspective view thereof.
Figure 38:
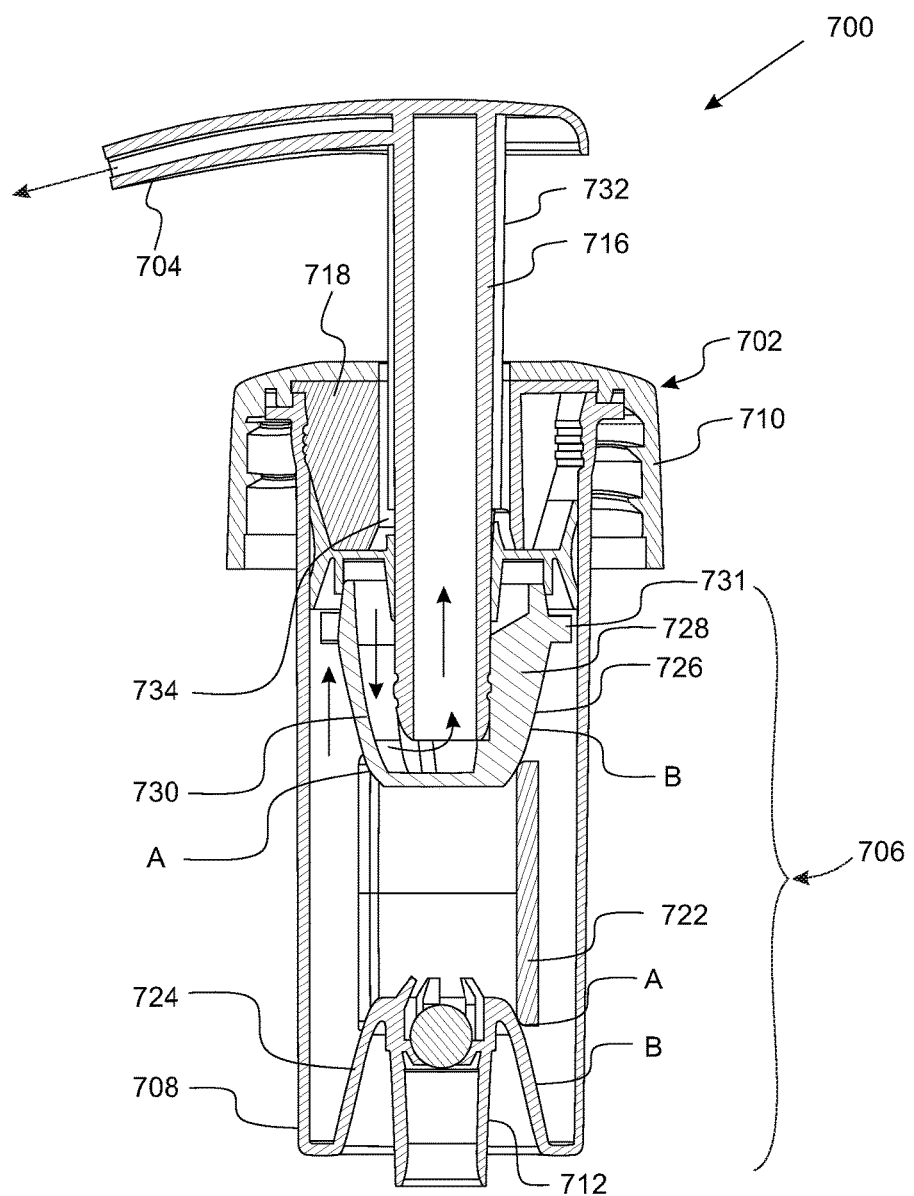
FIG. 38 is a cross-sectional view thereof taken along line 38-38 of FIG. 36.
Figure 39:
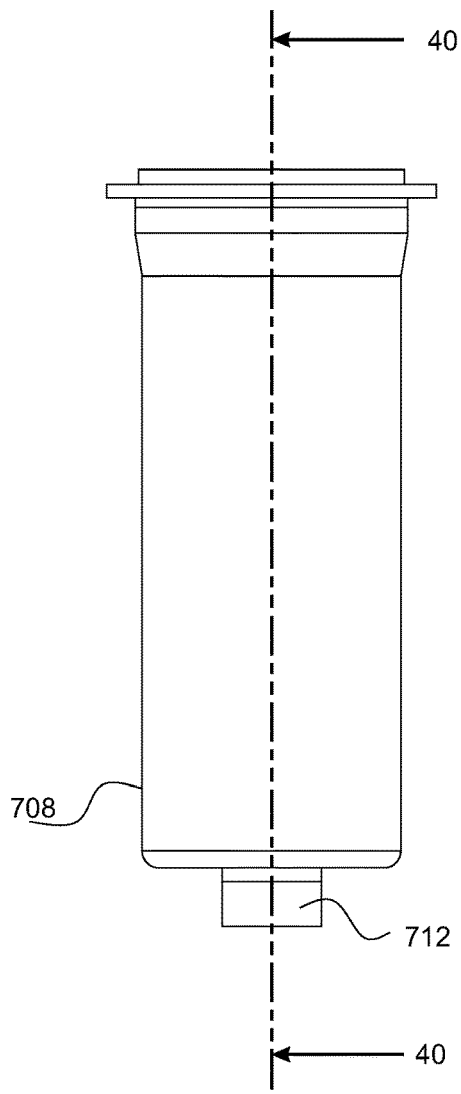
FIG. 39 is a plan view of the accumulator.
Figure 40:
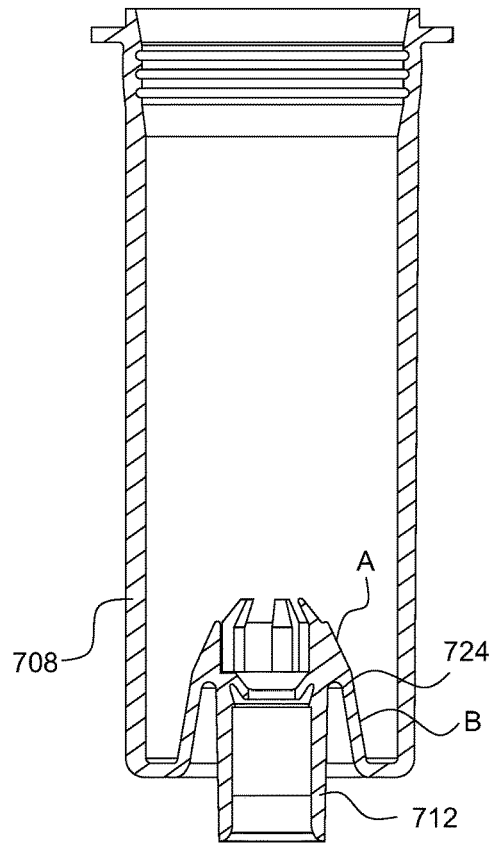
FIG. 40 is a cross-sectional view thereof taken along line 40-40 of FIG. 39.
Figure 41:
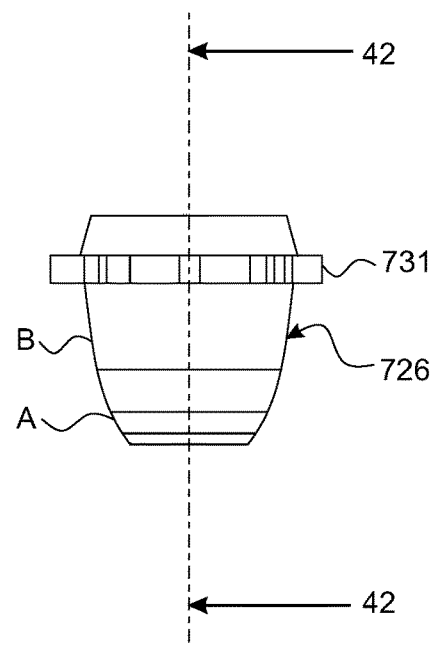
FIG. 41 is a plan view of the second loading cone.
Figure 42:
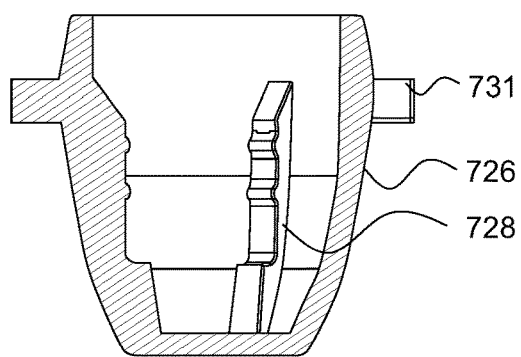
FIG. 42 is a cross-sectional view thereof taken along line 42-42 of FIG. 41.

Turning now to FIGS. 35-48 a preferred exemplary embodiment of the dispensing pump is illustrated and generally indicated at 700. The dispensing pump 700 comprises a pump base assembly 702, a dispensing head 704 and a polymer compression spring assembly 706. The pump base assembly 702 includes an accumulator cup 708 that is secured within the neck of a container (not shown) with a closure ring 710. In the exemplary illustration, the closure ring 710 is threaded for attachment to a threaded container neck. Referring to FIGS. 38 and 40, the accumulator 708 has a dip tube inlet 712 formed in the bottom wall thereof and a ball valve 714 is located within the dip tube inlet 712. The dispensing head 704 is integrally formed at the top end of a piston stem 716 which extends through the closure ring 710 and into the accumulator 708. The piston stem 716 is guided axially within the accumulator 708 by an annular chaplet 718 which is threadably received within the top peripheral edge of the accumulator 708. A piston seal 720 (see FIGS. 37-38) is received on the piston stem 716 midway along the length thereof.

The compression spring assembly 706 is received within the accumulator 708, and comprises a cylindrical slotted tubular spring element 722 and first and second loading cones 724, 726. The first loading cone 724 of the present embodiment is integrally formed with the bottom wall of the accumulator 708 and extends upwardly around the dip tube inlet 712 and ball valve 714.

The second loading cone 726 is molded as a separate cup shaped component with an open top, a hollow interior and interior ribs 728 which are snap received onto corresponding ridges 730 the terminal end of the piston stem 716. The ribs 728 are formed such that the terminal end of the piston stem 716 is positioned slightly above the interior bottom wall of the loading cone 726 and such that a passage is provided from the interior of the loading cone 726 into the interior passage 729 of the piston stem 716 (see arrows in FIG. 38). It is noted here that the piston stem 716 extends coaxially through the piston seal 720 such that the piston seal 720 is located above the second loading cone 726. Further the exterior surface of the second loading cone 726 includes radially outward guides 731 which assist proper sliding movement of the loading cone 726 within the interior wall of the accumulator 708.

The loading cones 724, 726 have both the preloading surface A and primary loading surface B described hereinabove. The cylindrical slotted tubular spring element 722 is received within the accumulator 708 between the first and second loading cones 724, 726. While the exemplary embodiment herein is illustrated with a cylindrical tubular spring element 722 it should be understood that the spring element 722 may comprise any of the herein described spring elements. Likewise, the loading cones 724, 726 may be formed with any of the configurations described herein above.

Figure 43:
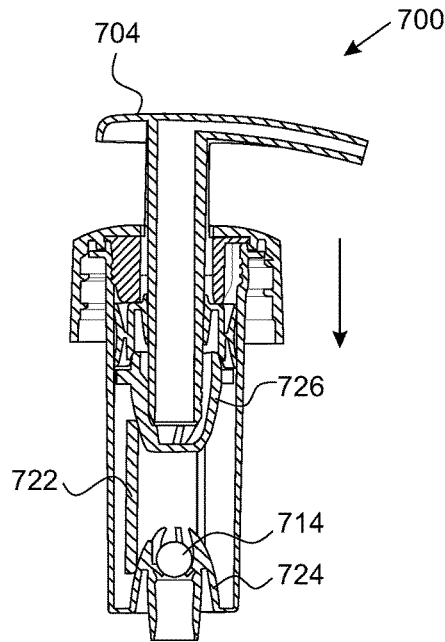
FIGS. 43-48 are cross-sectional views thereof showing a complete pump stroke sequence.
Figure 44:
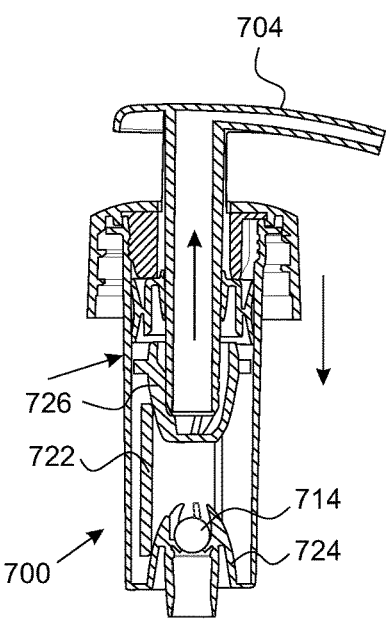
Figure 45:
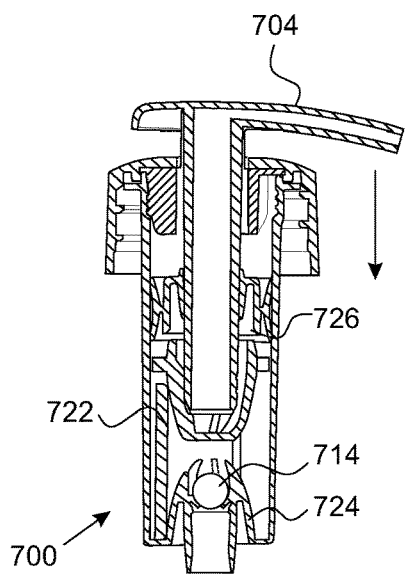
Figure 46:
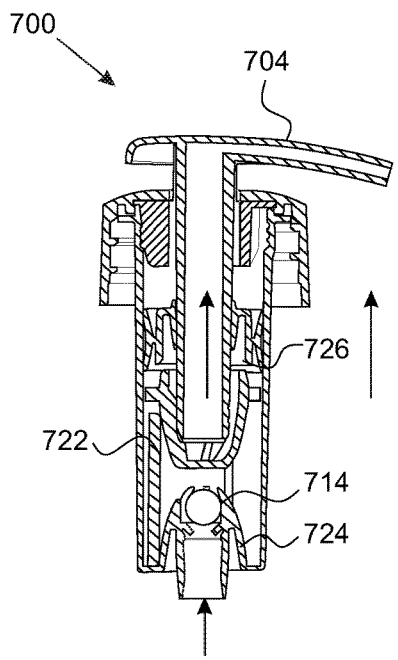
Figure 47:
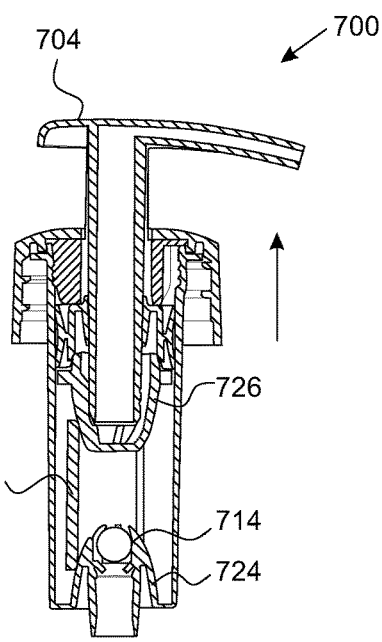
Figure 48:
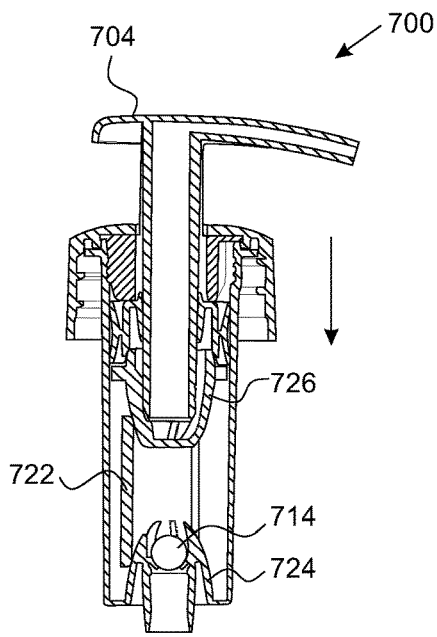

Turning to FIGS. 43-48 a complete dispensing sequence for the present embodiment 700 is illustrated. FIG. 43 illustrates a starting position with the loading cones 724 slightly pre-loaded and the ball valve 714 closing the dip tube inlet port 712. During assembly, the chaplet 718 threads down into the top of the accumulator 708 and compresses the various components together in a slightly pre-loaded condition. Moving to FIG. 44, downward compression of the dispensing head 704 and piston stem 716 causes a corresponding downward compression of the second loading cone 726, the start of elastic radial expansion of the slotted tubular spring element 722, and opening of a dispensing passage between the bottom of the piston seal 720 and the top edge of the second loading cone 726. In FIG. 45, further downward compression of the dispensing head 704 moves both the loading cone 726 and the piston seal 720 providing pumping action. A set of circumferentially spaced guide ribs 732 extending longitudinally down the exterior wall of the piston stem 716 have terminal shoulders 734 which engage the center ring of the piston seal 720 and cause corresponding downward movement thereof along with the dispensing head 704. Material within the accumulator 708 is forced down into the interior of the second loading cone 726, upward into the interior stem passageway 729 and upwardly into the dispensing head 704. Turning to FIGS. 46-48, release of the dispensing head 704 frees the spring element 722 to radially contract and create an upward axial force to return the piston stem 716, piston seal 720 and dispensing head 704 back to their normal at rest positions. In returning to the start position, the ball valve 714 is opened (FIG. 46) to draw fresh material from the container into the accumulator 708 (FIG. 47). At completion of the pump stroke, the ball valve 714 re-seats itself to close the dip tube inlet 712.

It can therefore be seen that the exemplary embodiments provide unique and novel dispensing pump assemblies in which all the discrete components may be molded from a single plastic material to facilitate single stream plastic recycling. Further, the all plastic compression spring assemblies can be advantageously used in all plastic dispensing pumps which can then also be easily recycled. [72] While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing pump comprising:
a pump base;
a dispensing head including a piston stem which is axially guided within the pump base; and
a compression spring assembly comprising:
   a slotted tubular spring element formed from a tensile polymer material;
   a first loading cone received at a first end of said slotted tubular spring element, said first loading cone being fixed relative to said pump base; and
   a second loading cone received at said second end of said slotted tubular spring element, said second loading cone being movable relative to said pump base,
said tubular spring element being received coaxially about the piston stem between said first and second loading cones,
said second loading cone being axially compressible with said piston stem toward the first loading cone and within said slotted tubular spring element,
whereby said slotted tubular spring element radially expands in tension to create an opposing axial extension spring force.

2. The dispensing pump of claim 1 wherein said slotted tubular spring element is cylindrical.

3. The dispensing pump of claim 1 wherein said slotted tubular spring element has strain reducing ribs extending longitudinally along opposing slot edges.

4. The dispensing pump of claim 1 wherein said slotted tubular spring element is hyperboloid in shape.

5. A dispensing pump comprising:
a pump base including an accumulator;
a dispensing head including a piston stem which is guided within the pump base and has a terminal end which extends into the accumulator;
a piston seal received at the terminal end of the piston stem and forming a seal with inner walls of the accumulator; and
a compression spring assembly comprising:
   a slotted tubular spring element formed from a tensile polymer material; and
   first and second loading cones received at opposing first and second ends of said slotted tubular spring element,
said piston stem extending coaxially through said first loading cone which is fixed relative to said pump base, and further extending coaxially through said second loading cone which is movable with said dispensing head relative to said pump base,
said tubular spring element being received coaxially about the piston stem between said first and second loading cones,
said second loading cone being axially compressible with said dispensing head toward the first loading cone and within said slotted tubular spring element,
whereby said slotted tubular spring element radially expands in tension to create an opposing axial extension spring force.

6. The dispensing pump of claim 5 wherein said slotted tubular spring element is cylindrical.

7. The dispensing pump of claim 5 wherein said slotted tubular spring element has strain reducing ribs extending longitudinally along opposing slot edges.

8. The dispensing pump of claim 5 wherein said slotted tubular spring element is hyperboloid in shape.

9. The dispensing pump of claim 5 wherein said first and second loading cones are disposed within the accumulator.

10. The dispensing pump of claim 5 wherein the first loading cone integrally formed with an upper exterior surface of said pump base, said second loading cone being integrally formed with an upper portion of said piston stem adjacent said dispensing head.

11. The dispensing pump of claim 10 wherein the slotted tubular spring element is hyperboloid in shape.

12. A dispensing pump comprising:
a pump base including an accumulator;
a dispensing head including a piston stem which is guided within the pump base and has a terminal end which extends into the accumulator;
a piston seal received about the piston stem; and
a compression spring assembly disposed within said accumulator, said compression spring assembly comprising:
   a slotted tubular spring element formed from a tensile polymer material; and
   first and second loading cones received at opposing first and second ends of said slotted tubular spring element,
said first loading cone being integrally formed with a bottom wall of said accumulator, said second loading cone being received at said terminal end of said piston stem and being movable with said dispensing head relative to said first loading cone, said tubular spring element being received coaxially about the piston stem between said first and second loading cones, said second loading cone being axially compressible with said dispensing head toward the first loading cone and within said slotted tubular spring element, whereby said slotted tubular spring element radially expands in tension to create an opposing axial extension spring force.

13. The dispensing pump of claim 12 wherein said slotted tubular spring element is cylindrical.

14. The dispensing pump of claim 12 wherein said slotted tubular spring element has strain reducing ribs extending longitudinally along opposing slot edges.

15. The dispensing pump of claim 12 further comprising a dip tube port within said bottom wall, and further having a ball valve within said dip tube port.

16. The dispensing pump of claim 12 wherein said pump base further includes a closure ring securing said accumulator to a neck of a container.

17. The dispensing pump of claim 15 wherein said pump base further includes a closure ring securing said accumulator to a neck of a container.

18. A dispensing pump comprising:

a pump base including an accumulator having a dip tube port within a bottom wall, and further having a ball valve within said dip tube port, said pump base further including a closure ring securing said accumulator to a neck of a container;

a dispensing head including a piston stem which is guided within the pump base and has a terminal end which extends into the accumulator;

a piston seal received about the piston stem and forming a seal with inner walls of the accumulator; and a compression spring assembly disposed within said accumulator, said compression spring assembly comprising:

a slotted tubular spring element formed from a tensile polymer material; and first and second loading cones received at opposing first and second ends of said slotted tubular spring element, said first loading cone being integrally formed with said bottom wall of said accumulator, said second loading cone being received at said terminal end of said piston stem and being movable with said dispensing head relative to said first loading cone, said tubular spring element being received coaxially about the piston stem between said first and second loading cones, said second loading cone being axially compressible with said dispensing head toward the first loading cone and within said slotted tubular spring element, whereby said slotted tubular spring element radially expands in tension to create an opposing axial extension spring force.

19. The dispensing pump of claim 18 wherein said slotted tubular spring element is cylindrical.

20. The dispensing pump of claim 18 wherein said slotted tubular spring element has strain reducing ribs extending longitudinally along opposing slot edges.

* * * * *